May 3, 1955  W. T. HONISS  2,707,353
REINFORCED FOREHEARTH CHANNEL JOINT
Filed Sept. 2, 1953
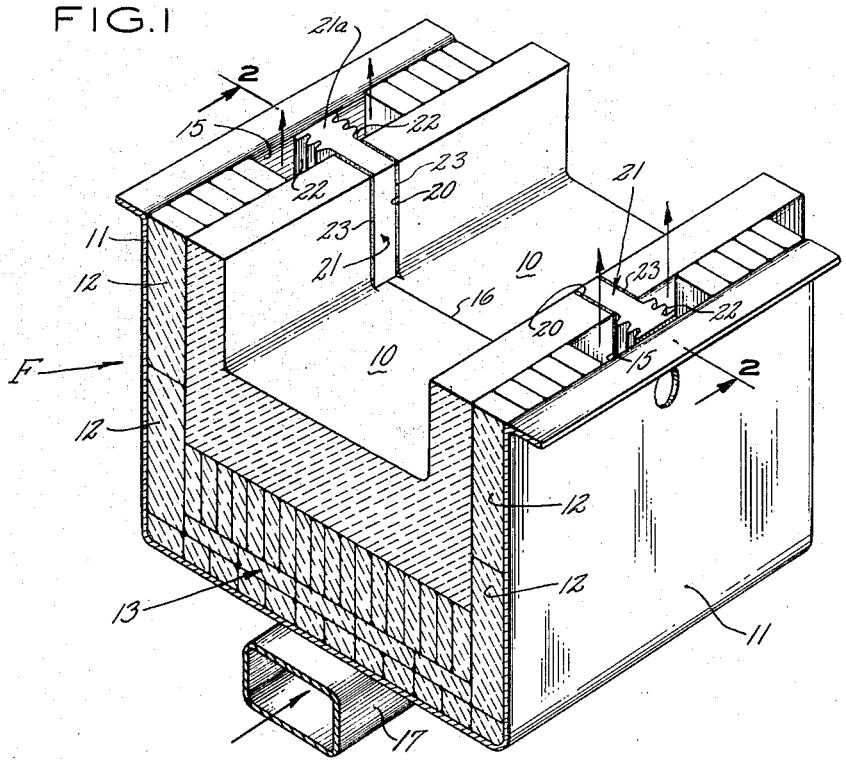
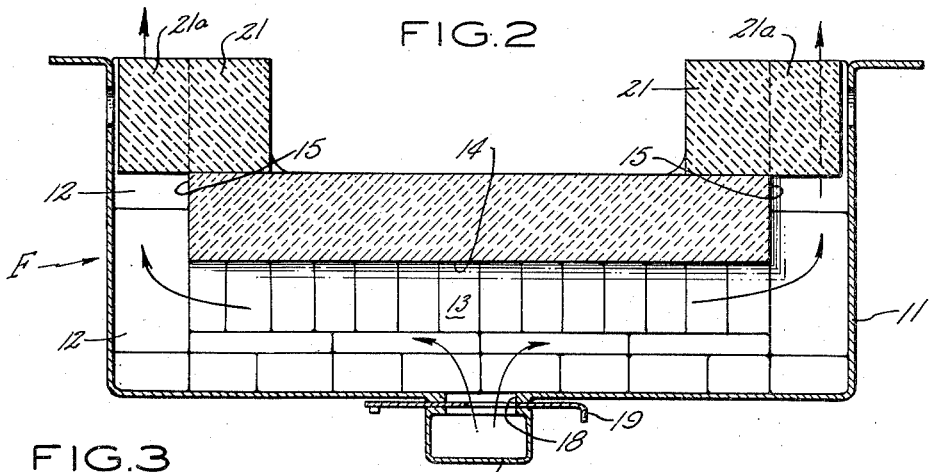
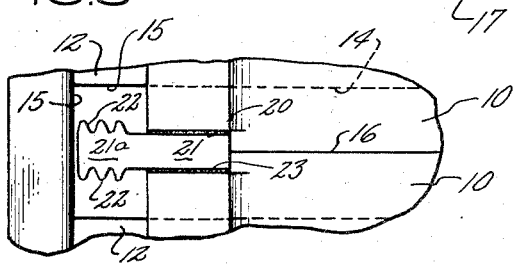
INVENTOR
WILLIAM T. HONISS
BY Bates & Willard
ATTORNEYS great # 2,707,353

United States Patent Office

Patented May 3, 1955

2,707,353

REINFORCED FOREHEARTH CHANNEL JOINT

William T. Honiss, West Hartford, Conn., assignor to Emhart Manufacturing Company, Hartford, Conn., a corporation of Delaware Application September 2, 1953, Serial No. 378,087

6 Claims. (Cl. 49—54)

This invention relates generally to improvements in molten glass conducting forehearth channels and more particularly to an improved structure and arrangement of parts at a joint between adjacent channel blocks.

A molten glass conducting forehearth channel customarily is formed of refractory blocks of bonded clay, of U shape in cross-section and arranged in end to end abutting relation. Such channel blocks are worn away and deteriorate rapidly where exposed to the high temperature and corrosive action of the molten glass, particularly at the joints between adjacent blocks. Seepage of molten glass into a joint increases the wear and depreciation of the blocks at the joint. It is desirable to insulate the channel blocks at their outer surfaces or backs to minimize loss of heat from the molten glass through the channel walls. This makes seepage of molten glass into and possibly through the joints more difficult to prevent. Molten glass leaking through the joint will rapidly eat away the ends of the adjacent channel blocks and widen the gap at the joint so as to allow increased leakage of glass. Should this occur, the insulation may be destroyed or impaired by glass leakage through the joint.

It has been proposed to leave the outer ends of the joints between adjacent refractory channel blocks bare and uninsulated and to apply cooling fluid thereto with a view to "freezing" glass seeping into the joint before it can leak through. Even though leakage of molten glass through the joint with resultant destruction or serious impairment of the insulation may thus be obviated, rapid wearing away of the portions of the bonded clay blocks at the inner end of the joint may still occur as an incident of normal operation of the forehearth channel. The useful life of a forehearth containing such a channel before it must be dismantled for rebuilding or repair therefore is comparatively short.

It has been suggested that the life of such a forehearth might be lengthened by substituting for the conventional channel blocks of bonded clay blocks made of a fused or electro-cast refractory material which has a higher resistance to attack from the molten glass. However, all such fused or electro-cast refractory materials of which I am aware have undesirable characteristics which as a practical matter preclude use of blocks made of any of them as substitutes for the conventional bonded clay blocks. Among such undesirable characteristics are their high heat conductivity; their tendency when heated to a high temperature likely if in contact with molten glass, particularly if insulated, to produce blisters in the glass; their relatively high cost; and their uneven surfaces.

The main object of the invention is to prolong considerably beyond normal the useful life of a forehearth channel which essentially comprises ordinary channel blocks, i. e., blocks made of bonded clay refractory material.

A more specific object of the present invention is to extract heat rapidly from portions of adjacent refractory channel blocks at the joint between them where wear is likely to occur so as to cool or reduce substantially the temperature of such portions of these blocks and reduce the wearing away or corrosion thereof by the molten glass to such an extent that substantial penetration of the joint by molten glass from the channel will be effectively prevented or substantially reduced.

A further object of the invention is to reinforce the joint between adjacent bonded clay blocks of a forehearth channel against wear from the molten glass in contact therewith by providing an insert of refractory material of greater resistance to wear and of higher thermal conductivity between portions of the clay blocks at the joint and in contact at one end with the molten glass and cooling the insert to an extent sufficient to provide a predetermined desirable temperature at its glass contacting end and so that it will extract heat rapidly from the adjacent portions of the clay blocks.

Other objects and advantages of the invention hereinafter will be pointed out or will become apparent from the following description of a particular embodiment thereof as shown in the accompanying drawings, in which:

Fig. 1 is a perspective view of a section of a forehearth channel structure, showing high heat conductive refractory inserts in place in the side walls of a forehearth channel at a joint between adjacent bonded clay channel blocks and projecting outwardly therebeyond into cooling passages;

Fig. 2 is a transverse vertical section on the line 2—2 of Fig. 1; and

Fig. 3 is a plan view of a fragmentary portion of the channel at the joint between adjacent blocks, showing one of the inserts and its cooling passage.

In the drawings, a forehearth channel structure, generally designated F, comprises U-shaped refractory channel blocks 10 arranged in end-to-end relation and supported within and spaced from a U-shaped metal casing 11 by side wall insulating blocks or bricks 12 and bottom insulating brick collectively designated 13. The bottom and side wall insulating members are arranged so as to leave a cooling space between the channel and the casing at the joint between channel blocks.

This cooling space or passage consists of a bottom portion 14 and uptake side portions 15. It leaves the back of adjacent channel blocks 10 bare at the joint therebetween, which is indicated at 16, Figs. 1 and 3, and also for a short distance in the direction of length of the forehearth channel at each of opposite sides of that joint. Cooling air, as from a suitable manifold 17 or other supply source may be introduced through a port 18 in the bottom of metallic casing 11 into the bottom portion 14 of the cooling space or passage approximately at its median point. Air flow from this port through bottom portion 14 of the cooling passage into and upwardly through the uptake side portions thereof may take place substantially as indicated by the direction arrows in Fig. 2. The cooling air may be under pressure and of the desired temperature or cooling effect. A damper 19 may be provided for regulable control of the admission of cooling air through port 18 into the channel joint cooling space.

The parts of the illustrative embodiment as described so far are conventional and per se do not form part of the present invention.

According to the present invention, the bonded clay blocks 10 are cut away at their adjacent ends at the place or places and to the extent required to accommodate the insert or inserts of electro-cast or fused refractory material to be placed in the joint between them. In the example shown, the ends of the upstanding side wall portions of adjacent blocks have been cut away as described to provide gaps 20 in these portions of the joint between them. Inserts 21 of a fused or electro-cast refractory material that has a high heat conductivity and resistance to attack from molten glass, as for example, Monofrax tile, are set in these gaps. The inserts 21 may have projecting outer end portions 21a extending across the cooling uptake side spaces 15 nearly to the adjacent portions of the metallic casing 11 and these projecting outer end portions of the inserts 21 may be formed with fluted or grooved side walls 22 to increase the area of contact of each with cooling air in its cooling passage. The extent of projection of the outer ends of the inserts may be varied in different installations from practically zero to such as to provide actual contact with the metallic casing side walls although I prefer a length of projection substantially as shown. While the inserts 21 may fit in their gaps in direct contact at their sides with the bonded clay blocks, I prefer to leave sufficient clearance to allow use of a suitable cement or luting as indicated at 23, having a high resistance to glass attack and the property of expanding instead of shrinking when exposed to temperatures customary in a forehearth channel. Such luting or cement will provide a good seal to obstruct entrance of glass between the side walls of the inserts and the adjacent surfaces of the bonded clay channel blocks in spite of the characteristically uneven surface of an electro-cast material such as is to be used for the inserts. Also, such a luting or cement will form a more uniform contact between the surfaces involved and thus aid abstraction of heat by the inserts from the lower heat conductive bonded clay channel blocks.

The amount of cooling air applied to the outer ends of the inserts can be regulated so as to maintain their inner ends, where they are in contact with molten glass, at a temperature below that at which such inserts will produce blisters in the glass and yet above a temperature at which undue chilling of the glass would take place. The temperature at which electro-cast or fused refractory material will produce blisters in the glass is believed to be in the order of 2400° F. and above. Since the area of contact of the inner ends of the inserts with the molten glass in the channel is only a very slight percentage of the total area of channel wall contact with the glass, the amount of chill given to the glass in getting the inner ends of the inserts to a temperature below that at which they would produce bubbles is negligible.

By the construction shown and described, the invention takes advantage of the high thermal conductivity of fused or electro-cast refractory material while avoiding its gassing characteristic and the difficulty resulting from its uneven surface. By the provisions described, heat will be abstracted rapidly from the bonded clay channel block surfaces exposed to glass attack at the channel joint and dissipated in the cooling air. The joint will thus be reinforced against wear and deterioration caused by the glass and the length of the useful life of a forehearth channel provided with such provisions should be considerably extended.

The inserts are shown only in the side wall portions of the channel joint as these are the portions most vulnerable to attack from the glass in normal operation. They may however be extended to or used in the bottom portion of the channel joint in any installation in which such extension or use is considered necessary or desirable.

The invention is susceptible of embodiment in forms differing in details from that shown in the drawings and herein particularly described and I therefore do not wish to be limited to such details.

I claim:

1. In a forehearth, a longitudinal section of a channel for conducting a stream of molten glass comprising two bonded clay refractory blocks having adjacent end surfaces and inner and outer surfaces spaced apart by a substantial thickness of the bonded clay of which said blocks are made, an insert of refractory material of higher resistance to molten glass attack and higher thermal conductivity than the bonded clay of said blocks interposed between and in good heat abstracting relation to portions of said adjacent end surfaces of said blocks and extending from their inner to their outer surfaces, said insert having an outer end portion projecting from between the adjacent end surfaces of said blocks beyond their outer surfaces, and, in combination therewith, means defining a cooling fluid passage into which the outer end portion of the insert extends, and regulable means to cause flow of cooling fluid in said passage into contact with and past the outer end portion of the insert therein.

2. In a forehearth, a longitudinal section of a channel for conducting a stream of molten glass comprising two bonded clay refractory blocks having adjacent end surfaces and inner and outer surfaces spaced apart by a substantial thickness of the bonded clay of which said blocks are made, an insert of refractory material of higher resistance to molten glass attack and higher thermal conductivity than the bonded clay of said blocks interposed between and in good heat abstracting relation to portions of said adjacent end surfaces of said blocks and extending from their inner to their outer surfaces, said insert having an outer end portion projecting from between the adjacent end surfaces of said blocks beyond their outer surfaces, and, in combination, heat insulation on the outer surfaces of said blocks, said insulation terminating short of the outer edges of the adjacent end surfaces of the blocks so as to define an air space into which the outer end portion of the insert projects, and means to force cooling air under pressure through said air space into intimate contact with and past said projecting end portion of the insert.

3. In a forehearth, the combination specified by claim 2 wherein said projecting outer end portion of the insert is formed with a fluted or corrugated surface to increase its area of surface contact with the cooling air passing through said air space.

4. In a forehearth, a longitudinal section of a channel for conducting a stream of molten glass comprising two bonded clay refractory blocks, each of U-shape in cross-section so as to have a flat bottom portion and a pair of upstanding side walls at opposite sides of the bottom portion, the end surfaces of the side walls of said blocks being cut back to provide narrow gaps between the adjacent ends of the corresponding side walls of the two blocks when said blocks are disposed in line with their bottom portions in abutting relation at their adjacent end surfaces, inserts of refractory material of higher resistance to molten glass attack and higher thermal conductivity than the bonded clay of said blocks disposed in said gaps between the adjacent ends of the side wall portions of the blocks with the inner ends of the inserts approximately flush with the inner surfaces of the side walls and the outer ends of the inserts projecting beyond the side walls, and means to pass streams of cooling air into contact with and past the projecting outer end portions of said inserts.

5. In a forehearth, the combination specified in claim 4 and wherein a cement highly resistant to glass attack and of a character to expand rather than shrink when exposed to molten glass temperatures is used as a luting between the inserts and the adjacent end wall surfaces of the blocks.

6. A forehearth channel for molten glass comprising bonded clay refractory blocks joined together and insulated externally at the sides and bottom, said channel having a joint extending between adjacent bonded clay blocks from the interior to the exterior of the channel and thus exposed to attack by molten glass in said channel, an insert in said joint made of material resistant to glass attack and having a higher thermal conductivity than that of the bonded clay material of said blocks, said insert providing a path to the exterior of said channel for rapid removal of heat from the part of the joint exposed to attack by the molten glass, said insert projecting from the outer end of the joint through a space left in the channel insulation, and, in combination therewith, means to subject the projecting outer end of the insert to a regulated cooling effect.

References Cited in the file of this patent

UNITED STATES PATENTS

| | | |
|---|---|---|
| 811,223 | Houze | Jan. 30, 1906 |
| 1,328,380 | Laird | Jan. 20, 1920 |
| 2,174,458 | Blau et al. | Sept. 26, 1939 |
| 2,582,477 | Cannon | Jan. 15, 1952 |

FOREIGN PATENTS

| | | |
|---|---|---|
| 996,009 | France | Aug. 29, 1951 |